(12) United States Patent
Jiang

(10) Patent No.: US 10,362,156 B2
(45) Date of Patent: Jul. 23, 2019

(54) REALIZATION METHOD AND APPARATUS FOR OPERATION FUNCTION IN TWO-WAY RADIO, AND TWO-WAY RADIO TERMINAL

(71) Applicant: HYTERA COMMUNICATIONS CORP., LTD., Shenzhen, Guangdong (CN)

(72) Inventor: Ning Jiang, Shenzhen (CN)

(73) Assignee: HYTERA COMMUNICATIONS CORP., LTD., Shenzhen (CN)

( * ) Notice: Subject to any disclaimer, the term of this patent is extended or adjusted under 35 U.S.C. 154(b) by 0 days.

(21) Appl. No.: 15/812,292

(22) Filed: Nov. 14, 2017

(65) Prior Publication Data
US 2018/0139319 A1 May 17, 2018

(30) Foreign Application Priority Data
Nov. 14, 2016 (CN) .......................... 2016 1 0999324

(51) Int. Cl.
H04M 1/725 (2006.01)
H04W 4/80 (2018.01)
H04W 80/12 (2009.01)

(52) U.S. Cl.
CPC ..... H04M 1/7253 (2013.01); H04M 1/72552 (2013.01); H04W 4/80 (2018.02); H04W 80/12 (2013.01)

(58) Field of Classification Search
CPC .. H04M 1/7253; H04M 1/72552; H04W 4/80
See application file for complete search history.

(56) References Cited

U.S. PATENT DOCUMENTS 5,880,732 A * 3/1999 Tryding .................. G06F 3/14
715/810
6,002,933 A * 12/1999 Bender ................. H04W 36/22
455/442
(Continued)

FOREIGN PATENT DOCUMENTS

CN 102981613 A 3/2013
GB 2449229 A * 11/2008 ........... H04B 1/3877

OTHER PUBLICATIONS

First Office Action from Chinese Application No. 201610999324.X dated Apr. 15, 2019.

*Primary Examiner* — Devan A Sandiford
(74) *Attorney, Agent, or Firm* — Calfee Halter & Griswold LLP

(57) ABSTRACT

The invention provides a method for implementing an operation function in a two-way radio. The method includes the steps of adapting the operation function to a wirelessly connected terminal in response to triggering of the operation function of the radio, and enabling the terminal to obtain a corresponding operation interface through adapting the operation function; receiving an operation instruction sent by the terminal, wherein the operation instruction is an operation instruction of the operation function; and executing the operation instruction, and implementing the operation function in the radio through the execution of the operation instruction. In addition, the invention provides an apparatus matching the method, and a two-way radio terminal. According to the method, the apparatus for implementing an operation function in the radio, and the radio terminal, the limitations of hardware conditions in the radio can be shielded, so that the implementation efficiency of the operation function in the radio is improved.

10 Claims, 6 Drawing Sheets

(56) References Cited

U.S. PATENT DOCUMENTS

| | | | | |
|---|---|---|---|---|
| 6,771,964 B1* | 8/2004 | Einola | H04W 36/0066 | 370/331 |
| 6,825,830 B1* | 11/2004 | Kanesaka | G08B 5/228 | 345/156 |
| 7,995,562 B2* | 8/2011 | Purnadi | H04W 36/0022 | 370/331 |
| 8,391,239 B2* | 3/2013 | Tenny | H04W 36/0066 | 370/280 |
| 8,738,061 B2* | 5/2014 | Klein | H04M 3/42178 | 455/521 |
| 8,812,000 B2* | 8/2014 | Pitkamaki | H04W 36/14 | 370/331 |
| 9,363,381 B2* | 6/2016 | Klein | H04M 3/543 | |
| 9,591,124 B2* | 3/2017 | Corretjer | H04M 3/2227 | |
| 9,674,635 B2* | 6/2017 | Klein | G06Q 30/04 | |
| 2002/0065041 A1* | 5/2002 | Lunsford | H04M 1/275 | 455/41.2 |
| 2002/0147647 A1* | 10/2002 | Ragsdale-Elliott | G06Q 20/20 | 705/15 |
| 2002/0168970 A1* | 11/2002 | Myojo | H04M 1/7253 | 455/426.1 |
| 2003/0050059 A1* | 3/2003 | Tsukamoto | H04M 1/7253 | 455/426.1 |
| 2003/0096633 A1* | 5/2003 | Goldberg | H04M 1/7253 | 455/556.1 |
| 2003/0114158 A1* | 6/2003 | Soderbacka | H04W 36/0066 | 455/436 |
| 2004/0100389 A1* | 5/2004 | Naito | G08B 1/08 | 340/691.6 |
| 2005/0073977 A1* | 4/2005 | Vanghi | H04W 36/0066 | 370/335 |
| 2005/0174488 A1* | 8/2005 | Chennakeshu | H04M 1/7253 | 348/552 |
| 2006/0242278 A1* | 10/2006 | Hawkins | H04M 1/72527 | 709/221 |
| 2007/0069976 A1* | 3/2007 | Willins | G02B 27/017 | 345/8 |
| 2007/0237126 A1* | 10/2007 | Pirila | H04W 8/245 | 370/349 |
| 2008/0305813 A1* | 12/2008 | Rao | H04M 1/7253 | 455/466 |
| 2009/0156215 A1* | 6/2009 | Pitkamaki | H04W 36/14 | 455/437 |
| 2009/0248820 A1* | 10/2009 | Basir | B60K 35/00 | 709/206 |
| 2010/0113024 A1* | 5/2010 | Wu | H04W 36/14 | 455/436 |
| 2010/0159973 A1* | 6/2010 | Thomas | H04W 76/45 | 455/509 |
| 2011/0238726 A1* | 9/2011 | Klein | G06Q 30/04 | 709/202 |
| 2011/0280382 A1* | 11/2011 | Mairs | G06F 17/276 | 379/93.01 |
| 2012/0036441 A1* | 2/2012 | Basir | H04M 1/642 | 715/734 |
| 2012/0188454 A1* | 7/2012 | Hasegawa | H04N 5/765 | 348/563 |
| 2013/0244714 A1* | 9/2013 | Klein | H04M 3/42178 | 455/521 |
| 2014/0004807 A1* | 1/2014 | Harmke | H04M 1/72527 | 455/90.2 |
| 2014/0189528 A1* | 7/2014 | Chang | H04M 1/6075 | 715/752 |
| 2015/0168920 A1* | 6/2015 | Nishihara | G04G 21/04 | 368/187 |
| 2015/0271339 A1* | 9/2015 | Klein | H04M 3/543 | 455/417 |
| 2015/0319298 A1* | 11/2015 | Corretjer | H04M 3/2227 | 455/404.1 |
| 2016/0112939 A1* | 4/2016 | Senese | H04B 7/26 | 370/329 |
| 2016/0278091 A1* | 9/2016 | Wang | G06F 3/167 | |

* cited by examiner

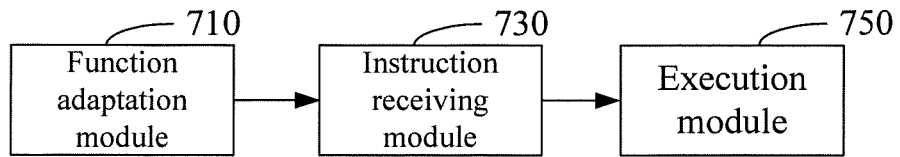
Fig. 9
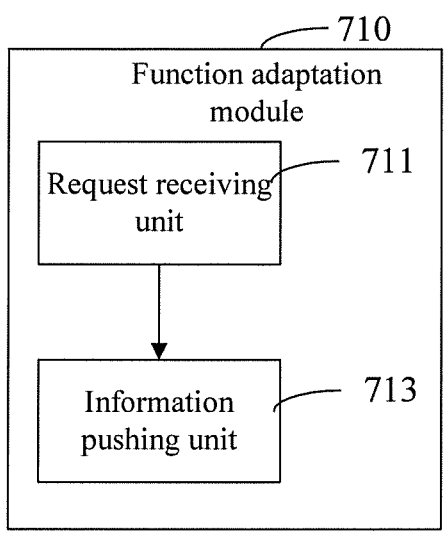
Fig. 10
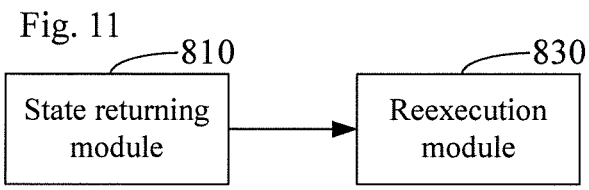
Fig. 11
Fig. 12
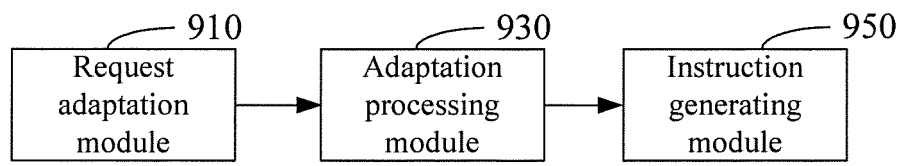

REALIZATION METHOD AND APPARATUS FOR OPERATION FUNCTION IN TWO-WAY RADIO, AND TWO-WAY RADIO TERMINAL

TECHNICAL FIELD

The present invention relates to the field of computer application technologies, and in particular, to a method and an apparatus for implementing an operation function in a two-way radio, and a two-way radio terminal.

BACKGROUND

As interphones are becoming more widely used in all aspects, the functions that they can support are no longer limited to a call function. Instead, they are moving toward more intelligent functions that enable the radios to support more and more operation functions.

However, due to the limitation of the hardware conditions in the radios, for example, the limitation of the screen size, the implementation of all the operation functions in the radios is more difficult and has the defect of low efficiency.

For example, when an operation of sending a short message or editing contacts is necessary, since a Sudoku input method is usually used at present, it is complicated and cumbersome to switch numbers and characters, and switch capital and small letters in a two-way radio with a smaller screen size.

SUMMARY

Based on this, it is necessary to provide a method for implementing an operation function in a two-way radio. Through the method, the limitation of hardware conditions in the radio can be shielded, so that the implementation efficiency of the operation function in the radio is improved.

Moreover, it is also necessary to provide an apparatus for implementing an operation function in a two-way radio. Through the apparatus, the limitation of hardware conditions in the radio can be shielded, so that the implementation efficiency of the operation function in the radio is improved.

In addition, it is also necessary to provide a two-way radio terminal. The radio terminal can shield the limitation of hardware conditions, so that the implementation efficiency of the operation function is improved.

A method for implementing an operation function in a two-way radio comprises:

adapting the operation function to a wirelessly connected terminal in response to triggering of the operation function of the radio, and enabling the terminal to obtain a corresponding operation interface through adapting the operation function;

receiving an operation instruction sent by the terminal, wherein the operation instruction is an operation instruction of the operation function; and executing the operation instruction, and implementing the operation function in the radio through the execution of the operation instruction.

In one embodiment, the step of adapting the operation function to a wirelessly connected terminal in response to triggering of the operation function of the radio, and enabling the terminal to obtain a corresponding operation interface through adapting the operation function comprises:

receiving a function push request through wireless connection, wherein the function push request is initiated by a terminal wirelessly connected with the radio; and obtaining related interface information according to the operation function triggered in the radio, and pushing the interface information to the terminal initiating the function push request, so that the terminal can adapt the operation function according to the interface information.

In one embodiment, after the step of executing the operation instruction, and implementing the operation function in the radio through the execution of the operation instruction, the method further comprises:

returning an executing state corresponding to the completion of executing the operation instruction to the terminal; and when the executing state is an unsuccessful executing state, receiving a reexecution request initiated by the terminal, and triggering the repeated execution of the operation instruction through the reexecution request until the operation instruction is successively executed.

A method for implementing an operation function in a two-way radio includes:

initiating, by a terminal, a function push request through wireless connection with the radio;

receiving response of the radio to the function push request, and adapting the operation function triggered in the radio through operation function information carried by the response to obtain an operation interface corresponding to the operation function; and generating an operation instruction through the operation triggered in the operation interface and sending the operation instruction to the radio.

In one embodiment, the step of receiving response of the radio to the function push request, and adapting the operation function triggered in the radio through operation function information carried by the response to obtain an operation interface corresponding to the operation function comprises:

receiving and obtaining the interface information through interface information push conducted by the radio in response to the function push request; and adapting the operation function of the radio according to the interface information to obtain the operation interface of the radio adapted to the terminal, and display the operation interface.

In one embodiment, the method further comprises:

receiving an executing state of the operation instruction returned by the terminal; and initiating a reexecution request to the radio, and successively executing the operation instruction in the radio through the reexecution request when the executing state is an unsuccessful state.

An apparatus for implementing an operation function in a two-way radio comprises:

a function adaptation module, configured to adapt the operation function to a wirelessly connected terminal in response to triggering of the operation function of the radio, and enable the terminal to obtain a corresponding operation interface through adapting the operation function;

an instruction receiving module, configured to receive an operation instruction sent by the terminal, wherein the operation instruction is an operation instruction of the operation function; and an execution module, configured to execute the operation instruction, and implement the operation function in the radio through the execution of the operation instruction.

In one embodiment, the function adaptation module comprises:

a request receiving unit, configured to receive a function push request through wireless connection, wherein the function push request is initiated by a terminal wirelessly connected with the radio; and an information pushing unit, configured to obtain related interface information according to the operation function triggered in the radio, and push the interface information to the terminal initiating the function push request, so that the terminal can adapt the operation function according to the interface information.

In one embodiment, the apparatus further comprises:

a state returning module, configured to return an executing state corresponding to the completion of executing the operation instruction to the terminal; and a reexecution module, configured to, when the executing state is an unsuccessful executing state, receive a reexecution request initiated by the terminal, and trigger the repeated execution of the operation instruction through the reexecution request until the operation instruction is successively executed.

An apparatus for implementing an operation function in a two-way radio comprises:

a request adaptation module, configured to initiate a function push request through wireless connection with the radio;

an adaptation processing module, configured to receive response of the radio to the function push request, and adapt the operation function triggered in the radio through operation function information carried by the response to obtain an operation interface corresponding to the operation function; and an instruction generating module, configured to generate an operation instruction through the operation triggered in the operation interface and send the operation instruction to the radio terminal.

In one embodiment, the adaptation processing module comprises:

an information receiving unit, configured to receive and obtain the interface information through interface information push conducted by the radio in response to the function push request; and an interface obtaining unit, configured to adapt the operation function of the radio according to the interface information to obtain the operation interface of the radio adapted to the terminal, and display the operation interface.

In one embodiment, the apparatus comprises:

a state receiving module, configured to receive an executing state of the operation instruction returned by the terminal; and a reexecution request module, configured to, when the executing state is an unsuccessful executing state, initiate a reexecution request to the radio, and successively execute the operation instruction in the radio through the reexecution request.

A two-way radio terminal includes at least one processor, at least one mobile communication radio frequency component, a memory and at least one communication bus, wherein the memory is stored with program codes, and the processor is configured to invoke the program codes stored in the memory to execute the following operations:

adapting the operation function to a wirelessly connected terminal in response to triggering of the operation function of the radio, and enabling the terminal to obtain a corresponding operation interface through adapting the operation function;

receiving an operation instruction sent by the terminal, wherein the operation instruction is an operation instruction of the operation function; and executing the operation instruction, and implementing the operation function in the radio through the execution of the operation instruction.

To solve the above technical problems, following technical solutions will be adopted:

When the radio itself triggers the operation function, the operation function is adapted to the wirelessly connected terminal, so that the terminal can obtain the corresponding operation interface through adapting the operation function adaptation. Under the action of the operation interface, the operation instruction sent by the terminal is received, wherein the operation instruction is the operation instruction of the operation function, and the operation function triggered in the radio can be implemented by executing the operation instruction; by adapting the operation function in the terminal through the radio, the operation which needs to be conducted in the radio is expanded and performed in the terminal, so that the radio is controlled through the operation interface obtained by adapting in the terminal, thereby shielding the limitation of the hardware conditions of the radio, and improving the implementation efficiency of the operation function, so that the radio can support various operation functions.

BRIEF DESCRIPTION OF THE DRAWINGS

FIG. 9 is a structural schematic diagram of an apparatus for implementing an operation function in a two-way radio in one embodiment;

FIG. 10 is a structural schematic diagram of a function adaptation module in FIG. 9;

FIG. 11 is a structural schematic diagram of an apparatus for implementing an operation function in a two-way radio in another embodiment;

FIG. 12 is a structural schematic diagram of an apparatus for implementing an operation function in a two-way radio applied to a terminal in one embodiment;

DETAILED DESCRIPTION

Embodiments embodying the features and advantages of the invention will be described in detail in the following description. It will be appreciated that the invention is capable of having various modifications in different embodiments without departing from the scope of the invention, and the description and illustration are substantially illustrative only, and are not intended to limit the invention.

Figure 1:
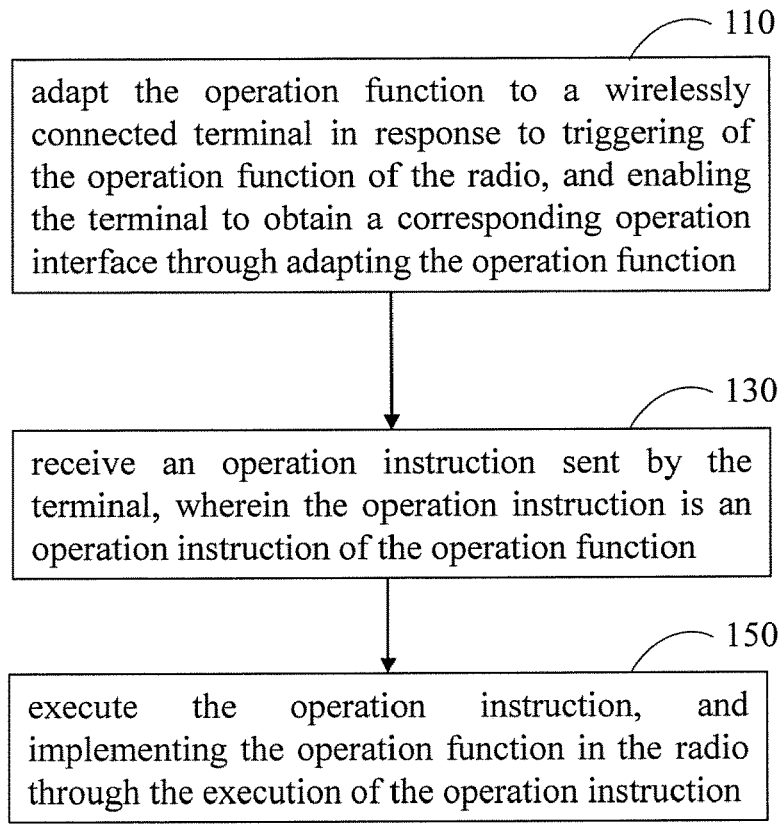
FIG. 1 is a flow chart of a method for implementing an operation function in a two-way radio in one embodiment.

FIG. 1 illustrates a method for implementing an operation function in a two-way radio method for implementing an operation function in a two-way radio in one embodiment. The method comprises the following steps:

In step 110, the operation function is adapted to a wirelessly connected terminal in response to triggering of the operation function of the radio, and the terminal is enabled to obtain a corresponding operation interface through adapting the operation function.

The operation function refers to functions in the radio implemented by triggering, such as short message function, call function, contact editing function, map viewing function, and information viewing function. The operation functions supported in the radio will be set according to users corresponding to the operation functions.

The radio itself initiates to adapt the operation function between the radio and the terminal through interaction with the terminal in the case that the operating function is triggered. The operation function is adapted on the basis that the radio is wirelessly connected with the terminal. In one embodiment, the wireless connection between the radio and the terminal is implemented via Bluetooth.

The terminal for adapting the operation function in the radio may be a portable mobile terminal that can be handheld by the user. The terminal is provided with a screen, and has a wireless connection function.

The operation interface obtained by the terminal through adapting the operation function is an interface corresponding to the operation function triggered by the radio at current, for example, when the radio triggers the short message function, a short message editing interface is adapted to the terminal.

In step 130, an operation instruction sent by the terminal is received, wherein the operation instruction is an operation instruction of the operation function.

The operation interface adapted to the terminal is used for providing a convenient operation entrance for the user of the radio, the operation interface intercepts various operations input by the user with respect to the operation function triggered in the radio, and generates operation instructions accordingly.

The operation instruction is sent to the radio by the terminal. At this moment, the radio receives and obtains the operation instruction through a self-provided lower layer API interface (Application Programming Interface).

In step 150, the operation instruction is executed, and the operation function is implemented in the radio through the execution of the operation instruction.

After receiving the operation instruction sent by the terminal, the radio executes the operation instruction, so as to implement the currently triggered operation function through the execution of the operation instruction.

According to the process as described above, the terminal is used as a controlling end of the radio to control the operation function triggered in the radio, so as to implement the operation function in the radio smoothly and use the advantages of the hardware conditions provided by the terminal to provide assistance to the radio, thus greatly simplifying the operation of the radio, and being beneficial for increasing new operation functions into the radio.

Figure 2:
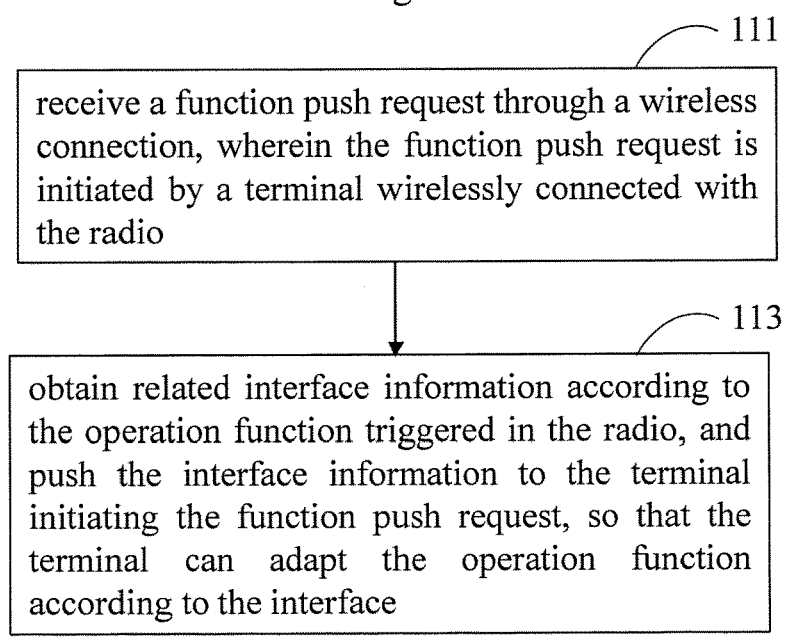
FIG. 2 is a flow chart of a method for adapting an operation function to a wirelessly connected terminal in response to triggering of the operation function of the radio, and enabling the terminal to obtain a corresponding operation interface through adapting the operation function in FIG. 1.

In one embodiment, the step 110, as shown in FIG. 2, comprises the following steps.

In step 111, a function push request is received through wireless connection, wherein the function push request is initiated by a terminal wirelessly connected with the radio.

The function push request is used for initiating to adapt the operation function in the radio. In the terminal wirelessly connected with the radio, a two-way radio service application is operated. Under the action of the radio service application, the function push request is initiated to the radio to trigger the radio to adapt the operation function to the radio.

In step 113, related interface information is obtained according to the operation function triggered in the radio, and the interface information is pushed to the terminal initiating the function push request, so that the terminal can adapt the operation function according to the interface information.

In the radio, the function push request initiated by the terminal is responded through the corresponding interface information obtained. The interface information is used for the corresponding operation interface for implementing the operation function currently triggered by the radio in the terminal.

It should be noted that the process will be carried out under the premise that the radio is wirelessly connected with the terminal.

Figure 3:
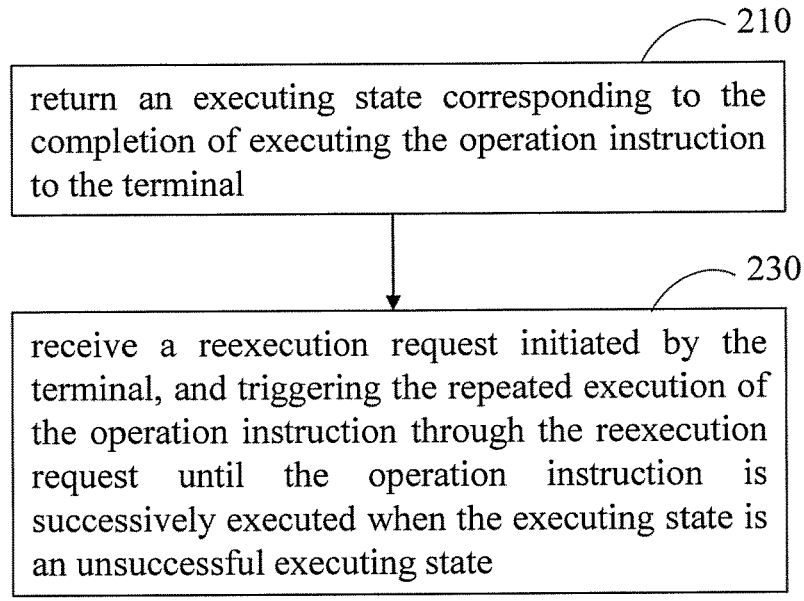
FIG. 3 is a flow chart of a method for implementing an operation function in a two-way radio in another embodiment.

In one embodiment, after the step 150, the method above, as shown in FIG. 3, further comprises the following steps.

In step 210, an executing state corresponding to the completion of executing the operation instruction is returned to the terminal.

Excluding receiving the operation instruction, the radio will also give a certain return value accordingly, i.e., the executing state corresponding to the completion of executing the operation instruction. The executing state includes a successful executing state and an unsuccessful executing state.

In step 230, when the executing state is an unsuccessful executing state, a reexecution request initiated by the terminal is received, and the repeated execution of the operation instruction is triggered through the reexecution request until the operation instruction is successively executed.

If the radio returns the unsuccessful executing state to the terminal, then the radio triggers the reexecution of the operation instruction through the reexecution request initiated by the terminal until the operation instruction is successively executed.

If the operation instruction cannot be successively executed, then a corresponding error prompt message is returned to the terminal, so as to complete the operation feedback of the radio to the terminal.

Through the radio and the terminal as described above, the advantages of the hardware in the terminal can be fully utilized without changing the usage habit of the existing interphone, so as to maximally improve the efficiency and enable the radio to implement rich operation functions.

Moreover, expansion of new operation functions can also be conducted for a number of old interphones, for example, rich operation functions can also be provided on the basis of the original narrow-band interphone, which greatly reduces the equipment investment, and can provide convenience for short-term evolution process from narrow-band to wide-band.

Figure 4:
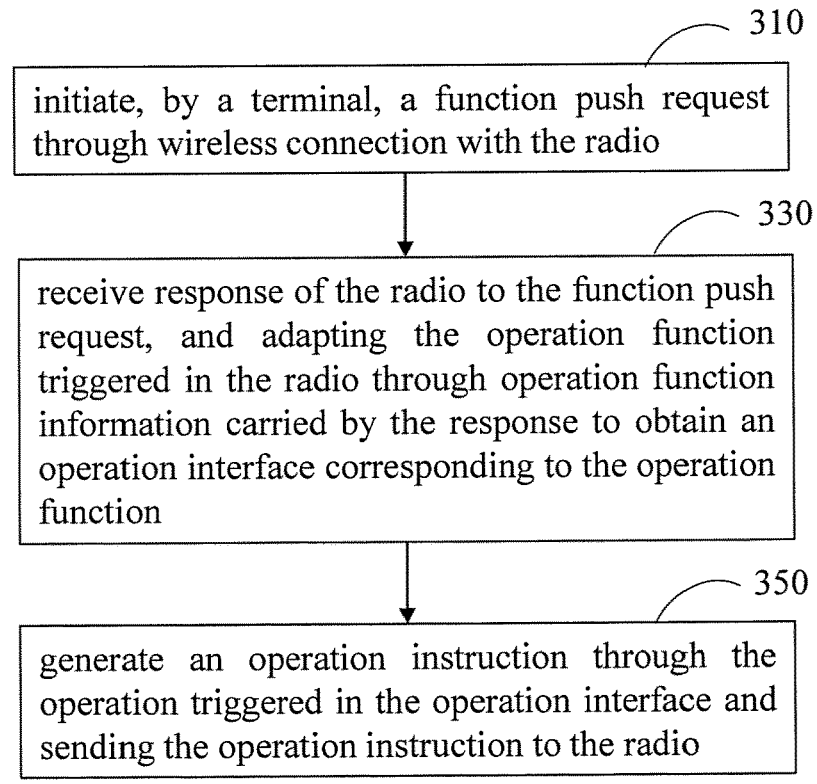
FIG. 4 is a flow chart of a method for implementing an operation function in a two-way radio applied to a terminal in one embodiment.

In one embodiment, a method for implementing an operation function in a two-way radio is also provided accordingly. As shown in FIG. 4, the method comprises the following steps.

In step 310, a terminal initiates a function push request through wireless connection with the radio.

A wireless connection petition is firstly initiated to the radio, and establishes a wireless connection with the radio after receiving a connection confirmation sent by the radio.

Based on this, the function push request is initiated directly through the wireless connection with the radio, so as to initiate to adapt the operation function of the radio.

In step 330, response of the radio to the function push request is received, and the operation function triggered in the radio is adapted through operation function information carried by the response to obtain an operation interface corresponding to the operation function.

In step 350, an operation instruction is generated through the operation triggered in the operation interface and the operation instruction is sent to the radio.

The operation interface is displayed in the terminal carried by a two-way radio user, and the user can trigger a corresponding operation in the operation interface, so as to control the operation function in the radio through the operation instruction generated.

Through the specific implementation above, the operation function in the radio provides operational inputs, so as to transfer various operations which have to be originally inputted in the radio to the operation interface of the terminal, thereby greatly reducing the input costs, and can improve the efficiencies.

Figure 5:
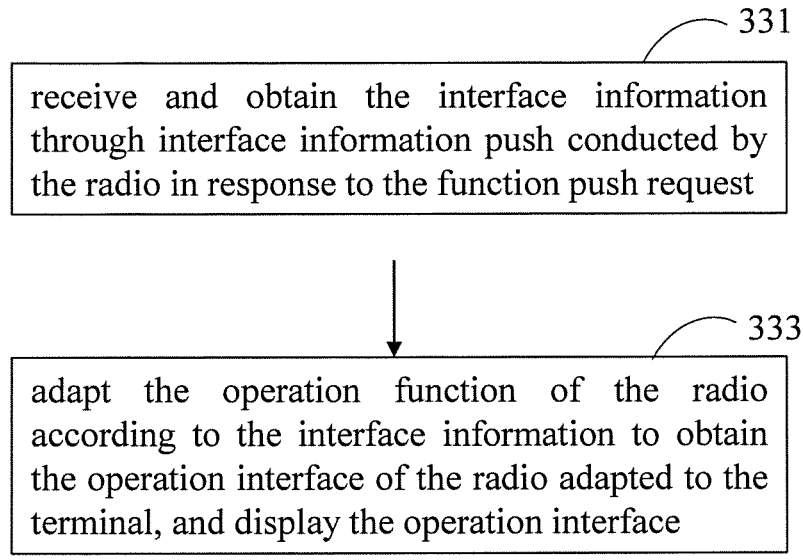
FIG. 5 is a flow chart of a method for receiving response of the radio to a function push request, and adapting the operation function triggered in the radio through operation function information carried by the response to obtain an operation interface corresponding to the operation function in FIG. 4.

In one embodiment, the step 330, as shown in FIG. 5, comprises the following steps.

In step 331, the interface information is received and obtained through interface information push conducted by the radio in response to the function push request.

In step 333, the operation function of the radio is adapted according to the interface information to obtain the operation interface of the radio adapted to the terminal, and display the operation interface.

Figure 6:
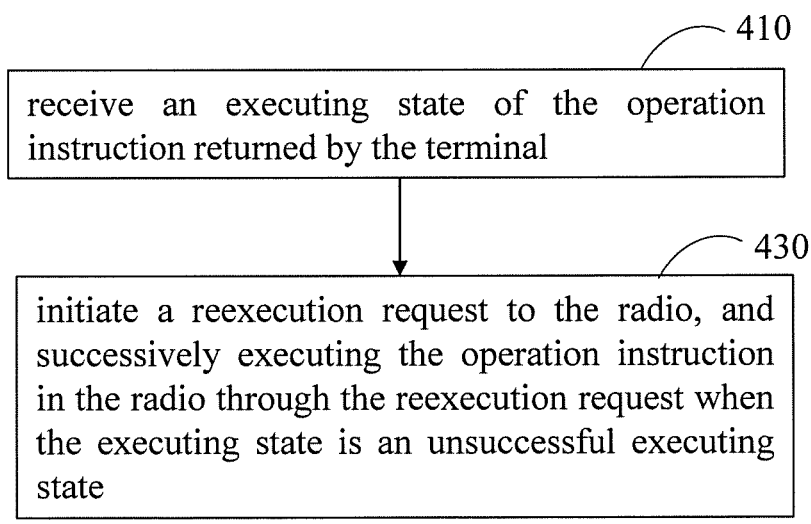
FIG. 6 is a flow chart of a method for implementing an operation function in a two-way radio applied to a terminal in another embodiment.

In another embodiment, the method above, as shown in FIG. 6, further comprises the following steps.

In step 410, an executing state of the operation instruction returned by the terminal is received.

In step 430, when the executing state is an unsuccessful executing state, a reexecution request is initiated to the radio, and the operation instruction is successively executed in the radio through the reexecution request.

In the radio as described above, the preset operation functions are different from each other according to different users. For example, for a police officer radio user, the preset contact editing function may be to edit or create a contact, and through the adaptation of the operation function in the radio, operations like batch import of contacts can be implemented at the terminal.

A preset map viewing function will also display the map as well as the location of the radio and the location of other police officers in the terminal to facilitate viewing.

A preset information viewing function may be a function of viewing multimedia crime suspect information, which will also be implemented in the terminal.

The adaptation of the operation function between the radio and the terminal is explained in detail with reference to the specific embodiments.

In the embodiment, a short message function is taken as an example for explanation.

Figure 7:
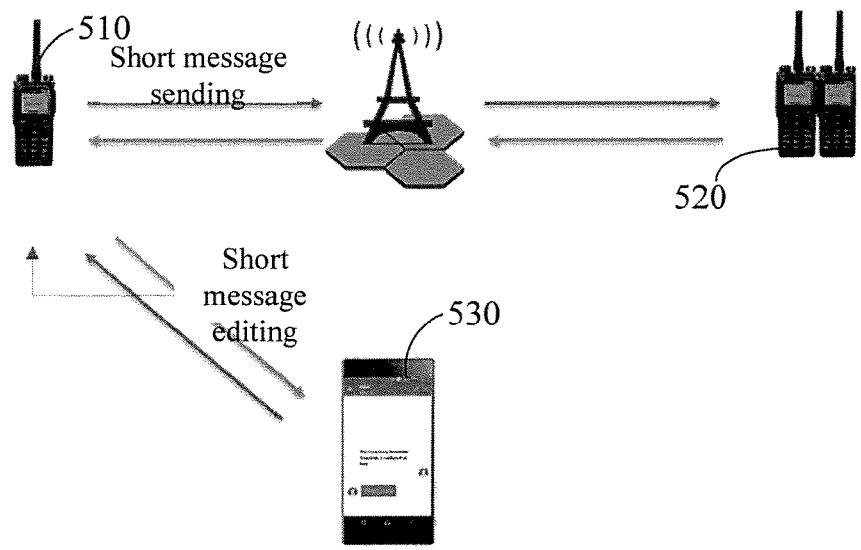
FIG. 7 is a schematic diagram of an application scenario for adapting a short message function between a two-way radio and a terminal in one embodiment.

As shown in FIG. 7, a police officer 1 expects to send a short message via a first interphone 510 to a second interphone 520 used by a police officer 2.

In this case, a smart terminal 530 hand-held by the police officer 1 initiates a Bluetooth connection request and establishes wireless connection between the smart terminal 530 and the first interphone 510 after receiving a connection confirmation from the first interphone 510.

The smart terminal 530 initiatively initiates a function push request to the first interphone 510. After receiving the function push request, the first interphone 510 pushes the corresponding interface information to adapt a short message editing interface to the smart terminal 530.

The police officer 1 can edit a short message in the short message editing interface provided by the smart terminal 530, and indicates the first interphone 510 to send the short message edited by the police officer 1 in the smart terminal 530 to the second interphone 520 through the corresponding operation instruction.

In the meanwhile, a short message sending-out state is fed back; if the short message is not sent successfully, then the first interphone 510 is requested to send the short message again until the short message is successfully sent.

The process as described above facilitates the user to edit, and improves the operation efficiency of the user to the maximum extent.

In another embodiment, a function of viewing multimedia crime suspect information is taken as an example for explanation.

Figure 8:
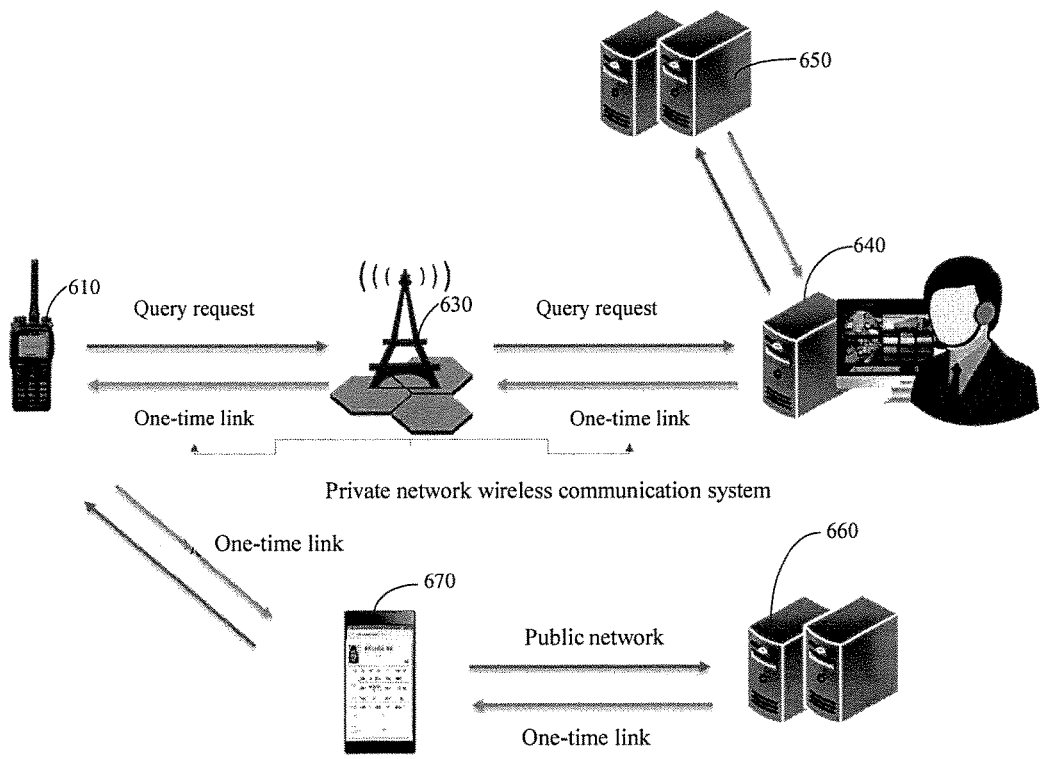
FIG. 8 is a schematic diagram of an application scenario for adapting a multimedia crime suspect information viewing function between a two-way radio and a terminal in one embodiment.

As shown in FIG. 8, a third interphone 610 sends a query request in a text form, wherein the query request includes crime suspect information, wanted criminal information, and geographical location information of other police officers, etc.

The query request is transmitted to a command center server 640 through a private network wireless communication system 630. After receiving the query request, the command center server 640 sends the query request to a comprehensive police affairs platform 650 through an IP network. Under the action of the comprehensive police affairs platform 650, the query result is saved in an information query service platform 660.

The information query service platform 660 can be accessed through the IP network. The information query service platform 660 generates a corresponding one-time link and feeds back the link to an adapted smart terminal 670 by the third interphone 610.

The smart terminal 670 accesses by using a form of link+Bluetooth random code RAND through the one-time link received, thus reviewing rich information.

Through the process as described above, it will be easier to implement different operation functions for the radio regarding different industries such as airport height, city management and petroleum, etc., without much modifications, thereby the investment is low and the universality is strong.

Moreover, the operation functions implemented in the existing interphone are also expanded and enriched through the process as described above.

In one embodiment, an apparatus for implementing an operation function in a two-way radio is also provided accordingly. As shown in FIG. 9, the apparatus includes a function adaptation module 710, an instruction receiving module 730 and an execution module 750, wherein:

a function adaptation module 710, configured to adapt the operation function to a wirelessly connected terminal in response to triggering of the operation function of the radio, and enable the terminal to obtain a corresponding operation interface through adapting the operation function;

an instruction receiving module 730, configured to receive an operation instruction sent by the terminal, wherein the operation instruction is an operation instruction of the operation function; and an execution module 750, configured to execute the operation instruction, and implement the operation function in the radio through the execution of the operation instruction.

Further, in the embodiment, and as shown in FIG. 10, the function adaptation module 710 includes a request receiving unit 711 and an information pushing unit 713, wherein:

the request receiving unit 711 is configured to receive a function push request through wireless connection, wherein the function push request is initiated by a terminal wirelessly connected with the radio; and an information pushing unit 713, configured to obtain related interface information according to the operation function triggered in the radio, and push the interface information to the terminal initiating the function push request, so that the terminal can adapt the operation function according to the interface information.

In another embodiment, as shown in FIG. 11, the apparatus as described above further includes a state returning module 810 and a reexecution module 830, wherein:

the state returning module 810 is configured to return an executing state corresponding to the completion of executing the operation instruction to the terminal; and the reexecution module 830 is configured to, when the executing state is an unsuccessful executing state, receive a reexecution request initiated by the terminal, and trigger the repeated execution of the operation instruction through the reexecution request until the operation instruction is successively executed.

In another embodiment, an apparatus for implementing an operation function in a two-way radio is also provided accordingly. As shown in FIG. 12, the apparatus includes a request adaptation module 910, an adaptation processing module 930 and an instruction generating module 950, wherein:

the request adaptation module 910 is configured to initiate a function push request through wireless connection with the radio;

the adaptation processing module 930 is configured to receive response of the radio to the function push request, and adapt the operation function triggered in the radio through operation function information carried by the response to obtain an operation interface corresponding to the operation function; and the instruction generating module 950 is configured to generate an operation instruction through the operation triggered in the operation interface and send the operation instruction to the radio.

Figure 13:
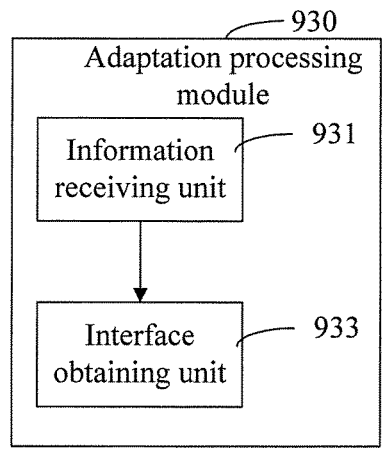
FIG. 13 is a structural schematic diagram of an adaptation processing module in FIG. 12.

Further, in the embodiment, and as shown in FIG. 13, the adaptation processing module 930 include an information receiving unit 931 and an interface obtaining unit 933, wherein:

the information receiving unit 931 is configured to receive and obtain the interface information through interface information push conducted by the radio in response to the function push request; and the interface obtaining unit 933 is configured to adapt the operation function of the radio according to the interface information to obtain the operation interface of the radio adapted to the terminal, and display the operation interface.

Figure 14:
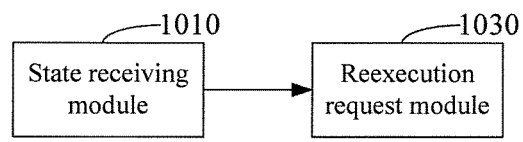
FIG. 14 is a structural schematic diagram of an apparatus for implementing an operation function in a two-way radio applied to a terminal in another embodiment.

In another embodiment, as shown in FIG. 14, the apparatus as described above further includes a state receiving module 1010 and a reexecution request module 1030, wherein:

the state receiving module 1010 is configured to receive an executing state of the operation instruction returned by the terminal; and the reexecution request module 1030 is configured to, when the executing state is an unsuccessful executing state, initiate a reexecution request to the radio, and successively execute the operation instruction in the radio through the reexecution request.

Figure 15:
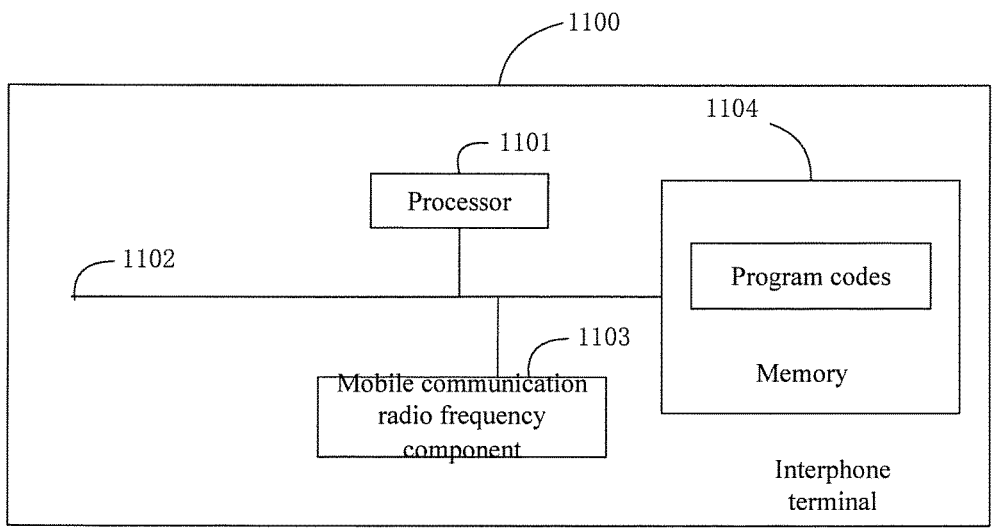
FIG. 15 is a structural schematic diagram of a two-way radio terminal in the embodiment of the present invention.

FIG. 15 is a structural schematic diagram of a two-way radio terminal in the embodiment of the present invention. The radio terminal 1100 may comprise: at least one processor 1101, such as a CPU, a baseband controller, etc., at least one mobile communication radio frequency component 1103, a memory 1104, and at least one communication bus 1102. The communication bus 1102 is configured to implement connection and communication among the components. The memory 1104 may either be a high speed RAM memory, or a non-volatile memory (non-volatile memory), for example, at least one disk memory. The memory 1104 may optionally be at least one memory device disposed far from the forgoing processor 901. The memory 1104 is stored with a group of program codes, and the processor 1101 is configured to invoke the program codes stored in the memory to execute the following operations:

adapting the operation function to a wirelessly connected terminal in response to triggering of the operation function of the radio, and enabling the terminal to adaptively obtain a corresponding operation interface through the operation function;

receiving an operation instruction sent by the terminal, wherein the operation instruction is an operation instruction of the operation function; and executing the operation instruction, and implementing the operation function in the radio through the execution of the operation instruction.

In one embodiment, in the step of adapting the operation function to a wirelessly connected terminal in response to triggering of the operation function of the radio, and enabling the terminal to obtain a corresponding operation interface through adapting the operation function executed by the processor 1101, the following operations are concretely executed:

receiving a function push request through wireless connection, wherein the function push request is initiated by a terminal wirelessly connected with the radio; and obtaining related interface information according to the operation function triggered in the radio, and pushing the interface information to the terminal initiating the function push request, so that the terminal can adapt the operation function according to the interface information.

In one embodiment, the processor 1101 also executes the following operations:

returning an executing state corresponding to the completion of executing the operation instruction to the terminal; and when the executing state is an unsuccessful executing state, receiving a reexecution request initiated by the terminal, and triggering the repeated execution of the operation instruction through the reexecution request until the operation instruction is successively executed.

Those having ordinary skills in the art should understand that all or a part of the steps of implementing the foregoing embodiments may be implemented by hardware or by instructing relevant hardware through a program. The program may be stored in a computer-readable storage medium and the storage medium mentioned above may be a read-only memory, a magnetic disk or an optical disk.

Although the invention has been described with references to several typical embodiments, it should be understood that the terms are used for illustration and explanation purposes and not for limitations. As the present invention can be embodied in various forms without departing from the spirit or substances of the invention, it should be understood that the above-mentioned embodiments are not limited to any of the foregoing details, but should be construed broadly within the spirit and scope as defined in the appended claims, and thus all changes and modifications that fall within the scope of the claims or the equivalents thereof shall be encompassed by the appended claims.

What is claimed is:

1. A method for implementing an operation function in a two-way radio, comprising:
    receiving a function push request through a wireless connection, wherein the function push request is initiated by a terminal wirelessly connected with the radio;
    adapting the operation function to the wirelessly connected terminal in response to the function push request, and obtaining related interface information according to an operation function triggered in the radio, wherein the interface information is pushed to the terminal to enable the terminal to display a corresponding operation interface, such that the terminal adapts the operation function according to the interface information;
    receiving an operation instruction sent by the terminal, wherein the operation instruction is an operation instruction of the operation function; and
    executing the operation instruction, and implementing the operation function in the radio through the execution of the operation instruction.

2. The method according to claim 1, wherein after the step of executing the operation instruction, and implementing the operation function in the radio through the execution of the operation instruction, the method further comprises:
    returning an executing state corresponding to the completion of executing the operation instruction to the terminal; and
    when the executing state is an unsuccessful executing state, receiving a reexecution request initiated by the terminal, and triggering the repeated execution of the operation instruction through the reexecution request until the operation instruction is successfully executed.

3. The method of claim 1, wherein the corresponding operating interface comprises a short message editing interface.

4. A method for implementing an operation function in a two-way radio, wherein the method comprises:
    initiating, by a terminal, a function push request through wireless connection with the radio;
    receiving response of the radio to the function push request, and adapting the operation function triggered in the radio through operation function information carried by the response to obtain an operation interface corresponding to the operation function; and
    generating an operation instruction through the operation interface triggered in the operation interface and sending the operation instruction to the radio.

5. The method according to claim 4, wherein the step of receiving response of the radio to the function push request, and adapting the operation function triggered in the radio through operation function information carried by the response to obtain an operation interface corresponding to the operation function comprises:
    receiving and obtaining the interface information through interface information push conducted by the radio in response to the function push request; and
    adapting the operation function of the radio according to the interface information to obtain the operation interface of the radio adapted to the terminal, and display the operation interface.

6. The method according to claim 4, wherein the method further comprises:
    receiving an executing state of the operation instruction returned by the terminal; and
    when the executing state is an unsuccessful executing state, initiating a reexecution request to the radio, and executing the operation instruction in the radio through the reexecution request until the operation instruction is successfully executed.

7. The method of claim 4, wherein the operation interface corresponding to the operation function comprises a short message editing interface.

8. An apparatus for implementing an operation function in a two way radio, comprising:
    a function adaptation module, configured to adapt the operation function to a wirelessly connected terminal in response to triggering of the operation function of the radio, and enable the terminal to obtain a corresponding operation interface through adapting the operation function;
    the function adaptation module further comprising:
        a request receiving unit, configured to receive a function push request through wireless connection, wherein the function push request is initiated by a terminal wirelessly connected with the radio; and
        an information pushing unit, configured to obtain related interface information according to the operation function triggered in the radio, and push the interface information to the terminal initiating the function push request, such that the terminal may adapt the operation function according to the interface information;
    an instruction receiving module, configured to receive an operation instruction sent by the terminal, wherein the operation instruction is an operation instruction of the operation function; and
    an execution module, configured to execute the operation instruction, and implement the operation function in the radio through the execution of the operation instruction.

9. The apparatus according to claim 8, wherein the apparatus further comprises:
    a state returning module, configured to return an executing state corresponding to the completion of executing the operation instruction to the terminal; and
    a reexecution module, configured to, when the executing state is an unsuccessful executing state, receive a reexecution request initiated by the terminal, and trigger the repeated execution of the operation instruction through the reexecution request until the operation instruction is successfully executed.

10. The method of claim 8, wherein the corresponding operation comprises a short message editing interface.

* * * * *